(12) United States Patent
Jungwirth et al.

(10) Patent No.: US 8,439,530 B2
(45) Date of Patent: May 14, 2013

(54) METHOD AND APPARATUS FOR SIMULATING SOLAR LIGHT

(75) Inventors: Douglas R. Jungwirth, Reseda, CA (US); Emilio Quezada, Sylmar, CA (US)

(73) Assignee: The Boeing Company, Chicago, IL (US)

( * ) Notice: Subject to any disclaimer, the term of this patent is extended or adjusted under 35 U.S.C. 154(b) by 276 days.

(21) Appl. No.: 13/028,357

(22) Filed: Feb. 16, 2011

(65) Prior Publication Data
US 2012/0206913 A1 Aug. 16, 2012

(51) Int. Cl.
*F21V 7/00* (2006.01)

(52) U.S. Cl.
USPC .................. 362/346; 362/350; 362/311.12

(58) Field of Classification Search .......... 362/236, 362/237, 241–245, 249.02, 249.06, 249.014, 362/249.16, 296.01, 297, 301, 302, 296.05, 362/296.1, 311.02, 311.09, 311.11–311.13, 362/326–328, 332, 346, 350, 351, 800
See application file for complete search history.

(56) References Cited

U.S. PATENT DOCUMENTS

| | | | |
|---|---|---|---|
| 2,550,805 A * | 5/1951 | Greenfield | .............. 434/290 |
| 3,112,886 A | 12/1963 | Kushner | |
| 3,322,946 A | 5/1967 | Cooper | |
| 3,701,521 A | 10/1972 | Levantine | |
| 4,125,775 A | 11/1978 | Chodak | |
| 4,225,908 A | 9/1980 | Small, Jr. | |
| 4,423,469 A | 12/1983 | Zerlaut et al. | |
| 4,641,227 A | 2/1987 | Kusuhara | |
| 4,701,023 A | 10/1987 | Hager et al. | |
| 4,789,989 A | 12/1988 | Stern et al. | |
| 5,109,465 A | 4/1992 | Klopotek | |
| 5,217,285 A | 6/1993 | Sopori | |
| 5,568,366 A | 10/1996 | Jefferies | |
| 5,623,149 A | 4/1997 | Kilmer | |
| 5,933,278 A | 8/1999 | Plummer et al. | |
| 5,984,484 A | 11/1999 | Kruer | |
| 6,097,556 A | 8/2000 | Shatz et al. | |
| 6,123,436 A | 9/2000 | Hough et al. | |
| 6,154,034 A | 11/2000 | Lovelady et al. | |
| 6,390,650 B1 | 5/2002 | Brandt et al. | |
| 6,548,819 B1 | 4/2003 | Lovelady | |

(Continued)

FOREIGN PATENT DOCUMENTS

| | | |
|---|---|---|
| DE | 1497276 | 6/1969 |
| DE | 202009011500 | 12/2010 |

(Continued)

OTHER PUBLICATIONS

PCT, International Search Report and Written Opinion, International Application No. PCT/US2012/022785 (Nov. 7, 2012).

*Primary Examiner* — Hargobind S Sawhney
(74) *Attorney, Agent, or Firm* — Diane M. Tsuda

(57) ABSTRACT

Described herein is a method and apparatus for simulating solar light to create an ideal testing environment for solar panels and the like. The method and apparatus may also be used to test solar resistance for color fading or resistance to high levels of solar energy. The apparatus generally consists of a plurality of mirrors directed towards a multi-faceted mirror, from which the light beams converge towards a target plane. The light intensity at the target plane is, according to one embodiment, between 100 and 200 suns.

30 Claims, 8 Drawing Sheets

U.S. PATENT DOCUMENTS

| | | |
|---|---|---|
| 6,590,149 B2 | 7/2003 | Adelhelm |
| 6,830,339 B2 | 12/2004 | Maximus |
| 7,066,608 B2 | 6/2006 | Davis et al. |
| 7,067,831 B2 | 6/2006 | Ahrens et al. |
| 7,128,441 B2 | 10/2006 | Monch |
| 7,178,948 B2 | 2/2007 | Gupta |
| 7,306,342 B2 | 12/2007 | Wu et al. |
| 2004/0246449 A1 | 12/2004 | Niwa |
| 2004/0257546 A1* | 12/2004 | Banine .................. 355/53 |
| 2006/0238750 A1 | 10/2006 | Shimotomai |
| 2007/0097691 A1 | 5/2007 | Wu |
| 2007/0206901 A1 | 9/2007 | Bonitatibus et al. |
| 2007/0267056 A1 | 11/2007 | Hishikawa |
| 2007/0279534 A1 | 12/2007 | Doser |
| 2008/0223441 A1 | 9/2008 | Jungwirth |
| 2009/0279277 A1 | 11/2009 | Jungwirth et al. |
| 2011/0241549 A1 | 10/2011 | Wootton |
| 2012/0155102 A1 | 6/2012 | Melzner et al. |

FOREIGN PATENT DOCUMENTS

| | | |
|---|---|---|
| EP | 0180800 | 5/1986 |
| FR | 2779259 | 12/1999 |
| RU | 2093859 | 10/1997 |

* cited by examiner

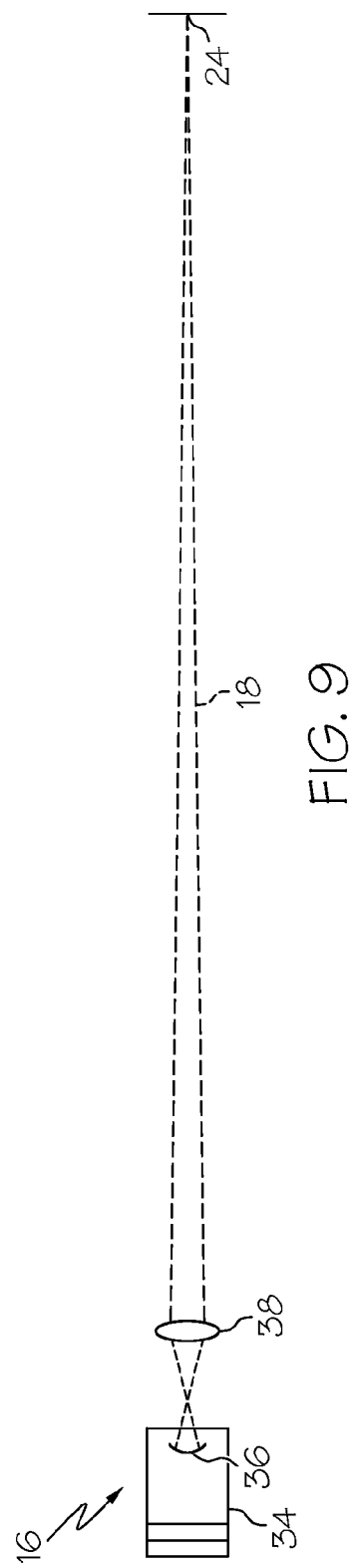

METHOD AND APPARATUS FOR SIMULATING SOLAR LIGHT

BACKGROUND

The present disclosure relates to systems and methods for providing artificial illumination, and more particularly, to systems and methods for simulating solar light.

Solar radiation, in the form of sunlight is difficult to simulate effectively on Earth because the sun functions as a point source but is a great distance from the surface of Earth, the light is generally modeled as unidirectional on earth. The photons of sunlight are collimated, with rays of sunlight parallel to one another. While this is not precisely accurate, the large size of the sun relative to the Earth and the great distance between the two makes it accurate for many circumstances. Because of these properties, it is difficult to simulate effectively solar energy over a large area with point-source or line-source lamps. Many tests of "solar" light are performed by using uncollimated light (for example, a spotlight) to approximate solar energy. However, because the light is not collimated and light photons impact the testing surface from any angle, test results may not effectively mimic what is seen in sunlight.

In order to simulate solar energy properly, light must be collimated through the use of various optics, such as lenses and mirrors. Further, sufficient light energy must be produced in order to mimic the intensity of solar energy across the entire illuminated field desired, with the light distributed evenly to provide adequate testing without "hot spots."

The use of solar energy is becoming increasingly important to the energy-producing sectors, and the need for effective and efficient solar panels is similarly increasing. In order to establish the effectiveness, efficiency, and reliability of solar cells, there is a need for a strong, reliable, lightweight, and easily adaptable light source that simulates solar energy effectively with a reliable and predictable amount of useable light energy.

There is also increased interest in exploring the near-sun planets and the space around the sun itself. In order to explore these regions effectively, it is necessary to devise a testing apparatus that can effectively mimic the sun's power at various distances, in order to establish the reliability and effectiveness of materials designed to travel closer to the sun. Therefore, there is a need for a reliable apparatus that can mimic solar energy at higher concentrations than those found on earth.

In addition to developing future technology of solar collectors and spacecraft, an apparatus that effectively mimics high levels of solar light may find practical uses for already existing situations. By way of example, because cars, trucks, and other vehicles are exposed to sunlight for long periods of time, it is necessary to know how long the paint covering the body of the vehicle will remain effective and attractive.

One method of establishing the amount of damage to the paint is to expose a painted sample to the sun for a set duration or until fading has occurred. However, since most paint samples are expected to last for ten years or more, this is an inefficient method of testing. One alternative is to expose a painted surface to high levels of solar energy (e.g., equivalent to 20 suns) for a short period of time (e.g., about 6 months) to determine effectiveness over a longer period of time (e.g., about 10 years). Therefore, there is recognized a need in the art for a solar simulator that can provide high levels of solar energy for testing solar exposure.

In addition to providing solar energy, there is also a need in the art for an easily adaptable solar testing apparatus that can provide various configurations of light energy to a location. For example, it may be necessary to include a pure white light to a target, or to provide light having a reduced ultraviolet saturation, or an increased blue saturation. This demand may be due to testing requirements, variations in local sun color, or a desire to measure the effects of various color saturations on a surface. Therefore, there is a need in the art for a solar testing apparatus that has a widely configurable color palette.

One problem with current methods is that they require a large amount of light in order to approximate the sun. This is because the photons of the light from conventional sources, such as spotlights, are not directional like solar energy but impact the surface from a variety of angles, and therefore do not closely approximate solar radiation. Therefore, there a need in the art for a more efficient solar simulator that appropriately models solar energy.

FIELD OF THE INVENTION

The present disclosure is directed to a high intensity light source that may be formed from a plurality of individual lamps focused onto a multi-faceted mirror with a substantially hemispherical outer surface that comprises an opening, and first and second rows of facets, each angled away from the opening.

A first collimated light source may be projected through the opening, a second set of collimated light sources may be reflected from the first row of facets, and a third set of light sources may be reflected from the third row of facets. These light sources may be combined to provide a high intensity light source at a target plane distal from the mirror.

BRIEF DESCRIPTION OF THE DRAWINGS

FIG. 9 is a schematic top plan view of an individual optical train according to another embodiment;

DETAILED DESCRIPTION

Figure 1:
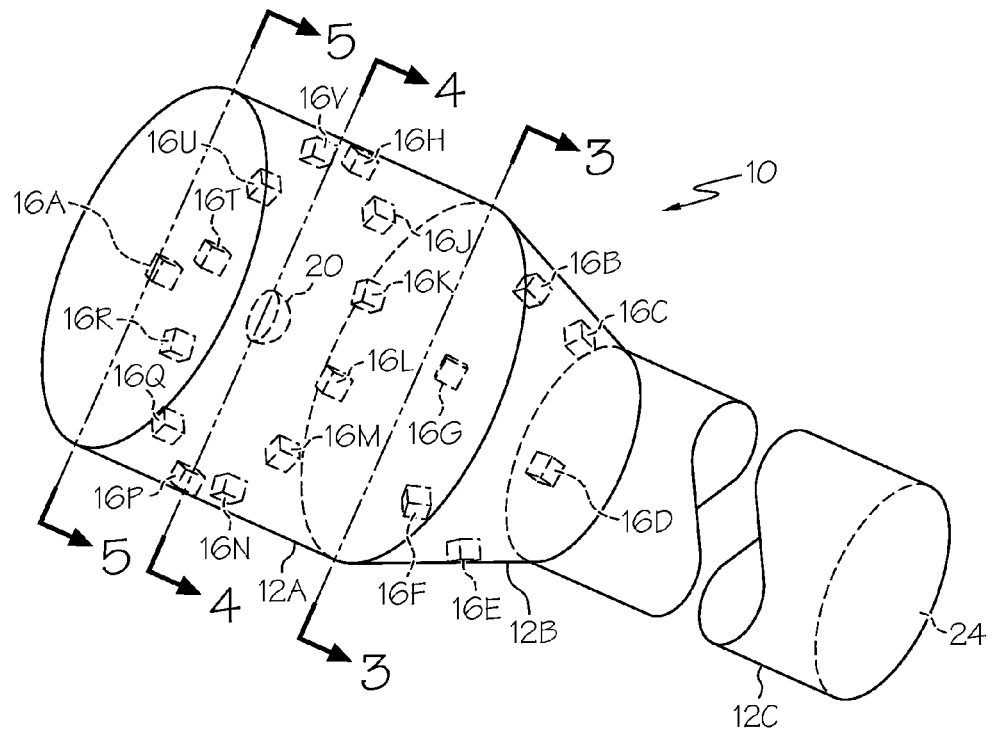
FIG. 1 is a perspective view of one embodiment of the apparatus for simulating solar light.

An apparatus according to one embodiment of the invention is illustrated in perspective in FIG. 1. This figure shows the solar simulator 10 may generally comprise an external frame (generally 12) that may consist of two cylindrical sections 12A,C joined by a frusto-conical section 12B. The entire external frame 12 may be enclosed to prevent light from passing into or out from the assembly therein. A number of lamp assemblies 16A-V (letters I, O, and S omitted; generally 16) are attached to the external frame 12 by means of lamp mounts 14 (see FIG. 6). The lamp assemblies 16 and lamp mounts 14 in FIGS. 1-5 are shown abstractly as rectangular blocks, to illustrate the position of the assemblies 16 and mounts 14 in relation to one another and the frame 12. The lamp assemblies 16 and mounts 14 are shown in greater detail in, e.g., FIGS. 6-7 and 9. The lamp mounts 14 and corresponding lamp assemblies 16 may be arranged with radial symmetry around a centrally-mounted multi-faceted mirror 20. The centrally-mounted multi-faceted mirror 20 may be attached to the external frame 20 by a mirror support structure 13 (see FIG. 5), and while shown to be mounted in the center of the frame 12, may be offset or positioned in another location without departing from the scope of the invention.

According to the illustrated embodiment, the centrally-mounted multi-faceted mirror 20 may be attached to the outer frame with rigid supports so that the optical and mechanical alignment may be held stationary with respect to the various lamp assemblies 16. In one embodiment, the mirror 20 may be held in position by the use of a mirror support structure 13 which extends radially from the mirror towards the edge of the first frame 12A. Alternatively, the mirror 20 may be held from the back, attached to the end of the first part of the frame 12A by means of a rigid support element. The support structure 13 may be attached in a manner so as not to cause any blockage or other interference of the incoming beams 18.

Figure 2:
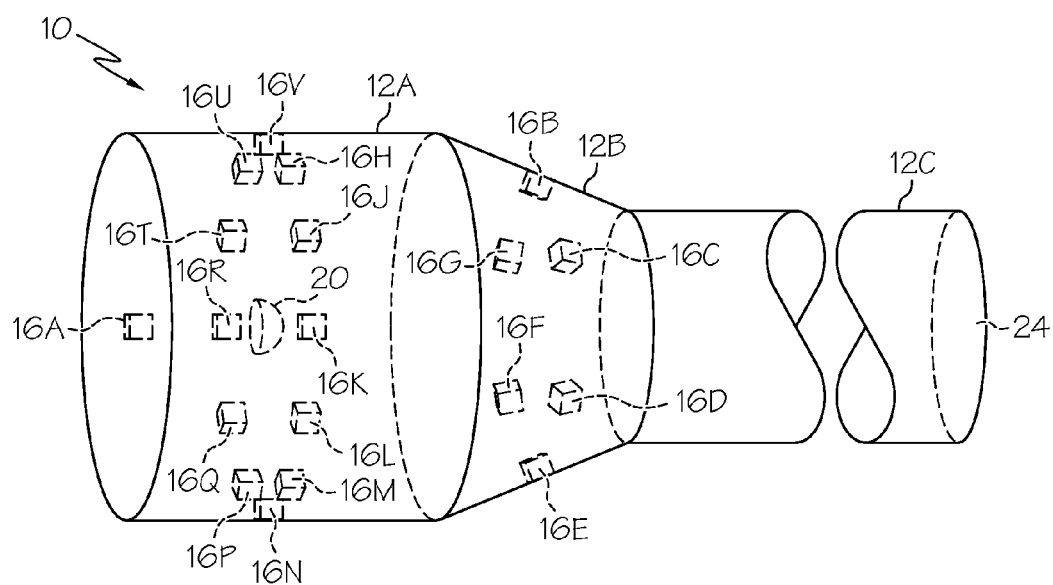
FIG. 2 is a side plan view of the embodiment shown in FIG. 1.

FIG. 2 illustrates a side view of the apparatus, demonstrating the arrangement of the lamp assemblies 16A-V. As shown in this figure, the lamp assemblies 16A-V may be arranged in three sections; a single lamp assembly 16A positioned at the end the first cylindrical section 12A opposite the frusto-conical section 12B; a group of six lamp assemblies 16B-G arranged about the frusto-conical section 12B; and a group of twelve lamp assemblies 16H-V positioned about the perimeter of the first cylinder 12A, spaced away from both ends of the first cylinder 12A. Each of the second 16B-G and third groups 16H-V of lamp assemblies are shown as being coplanar and rotationally symmetrical (see FIG. 5), but other arrangements may be used without departing from the scope of the invention.

Figure 3:
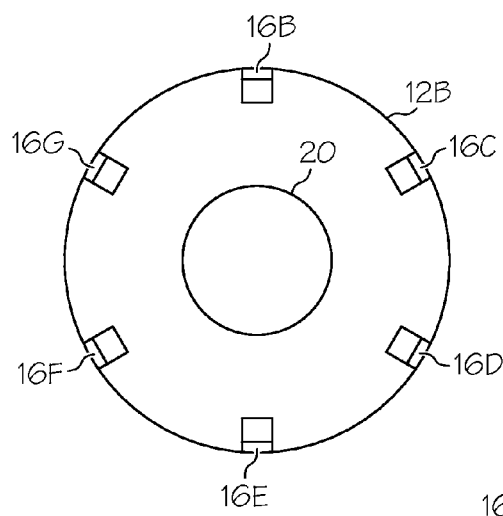
FIG. 3 is a plan view in section along line 3-3 of FIG. 1.
Figure 4:
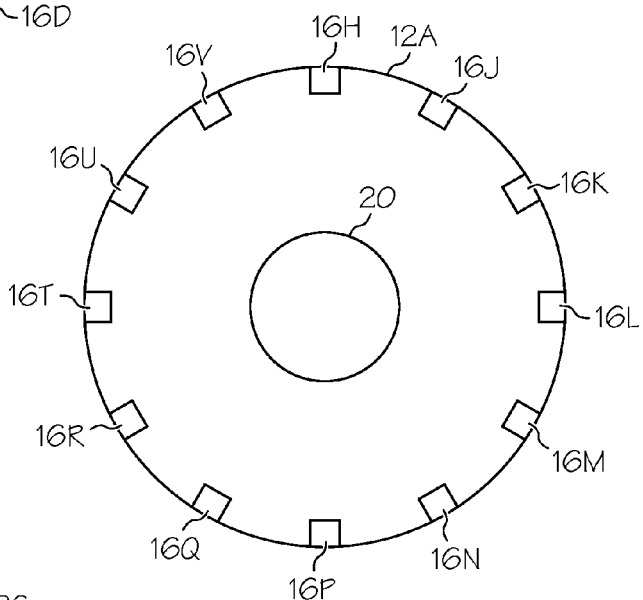
FIG. 4 is a plan view in section along line 4-4 of FIG. 1.
Figure 6:
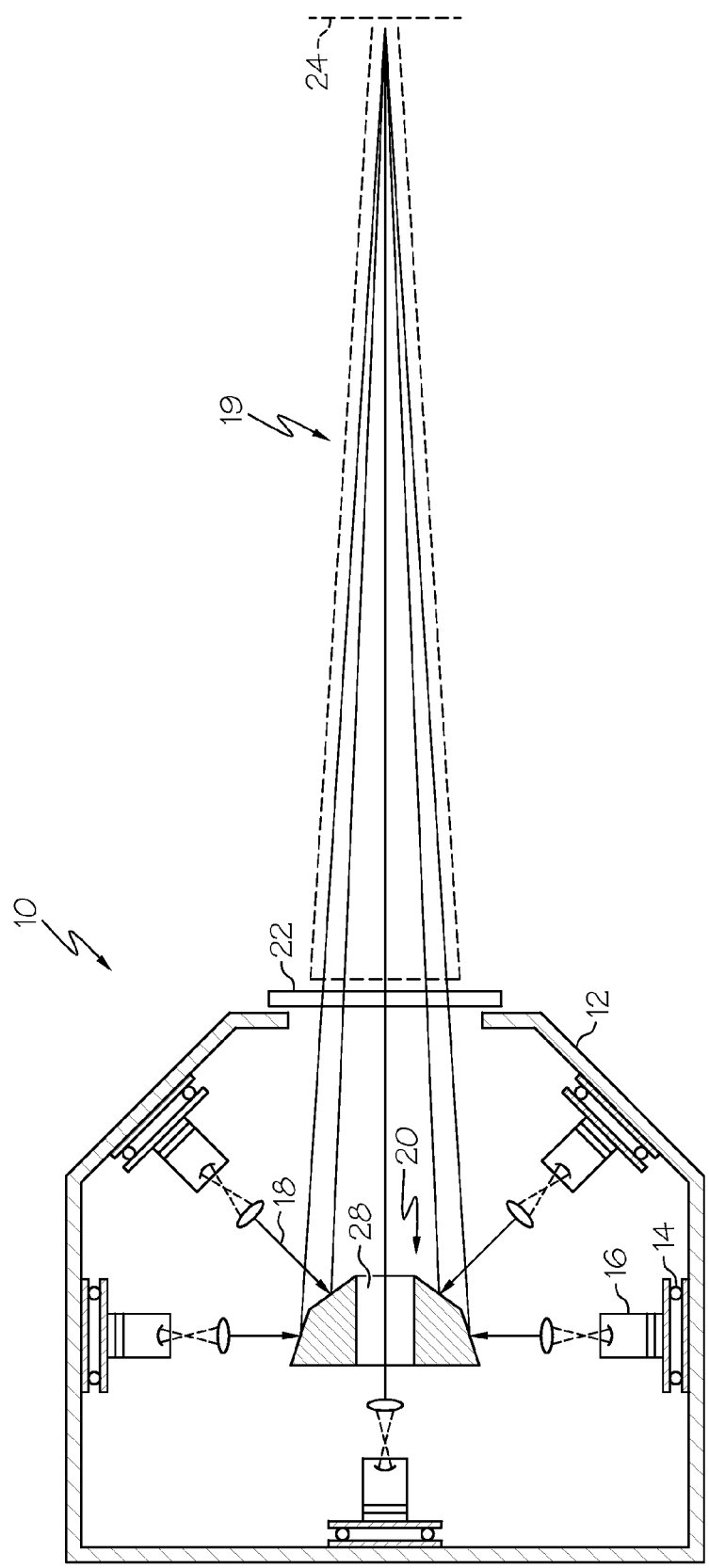
FIG. 6 is a schematic top plan view along line 6-6 of FIG. 5.

FIGS. 3 and 4 illustrate one possible arrangement of the first 16B-G and second 16H-V groups of lamp assemblies about the centrally-mounted multi-faceted mirror 20 as shown and described in the embodiment illustrated in FIGS. 1-2. As shown in FIG. 3, the first group may consist of six individual lamp assemblies 16B-G arranged in rotational symmetry about the centrally-mounted multi-faceted mirror 20 to form a hexagonal shape. As shown in FIG. 1, these lamp assemblies 16B-G may be mounted (such as by means of a lamp mount 14 as shown in FIG. 6) to the frusto-conical section 12B of the external frame 12. FIG. 4 illustrates that the second group may consist of twelve individual lamp assemblies 16H-V arranged in rotational symmetry about the centrally-mounted multi-faceted mirror 20 to form a dodecahedron. As shown in FIG. 1, these lamp assemblies 16H-V may be mounted (such as by means of a lamp mount 14 as shown in FIG. 6) to the first cylindrical portion 12A of the external frame 12 at a point between the ends of the first cylindrical portion 12A. In both of these groups, the lamp assemblies in each group may be arranged so that the distance from any one lamp assembly 16 in one group (either 16A-G or 16H-V) to a corresponding facet 26 (see FIG. 7) of the centrally-mounted multi-faceted mirror 20 is the same as all of the others in the group. While the described apparatus is one possible combination, it is contemplated that the lamps may be arranged with varying distances, positions, symmetries, or other arrangement without departing from the scope of the invention.

Figure 5:
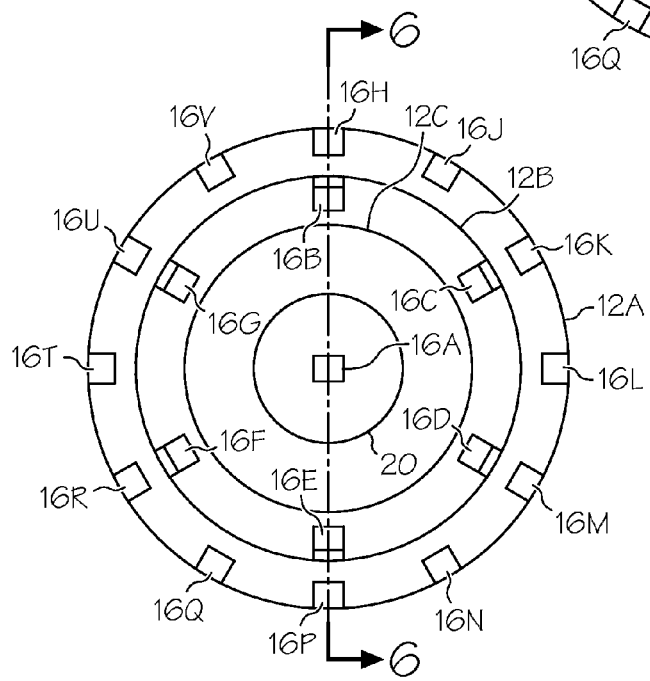
FIG. 5 is a plan end view in section along line 5-5 of FIG. 1.

FIG. 5 is a cutaway end view of the apparatus shown in FIG. 1, demonstrating the arrangement of the various lamp assemblies 16A-V relative to the centrally-mounted multi-faceted mirror 20. This view incorporates FIGS. 3 and 4, and shows one possible position for each lamp assembly 16A-V relative to the various portions of the external frame 12A-C. According to the illustrated embodiment, lamp assembly 16A may be located at the base of the first cylindrical frame element 12A along the axis of the frame 12, and not on the second cylindrical frame element 12C. Additionally, the centrally-mounted multi-faceted mirror 20 may be positioned along the central axis of the frame 12 and within the first frame element 12A.

FIG. 6 shows a cutaway view of one embodiment of the apparatus for simulating solar light taken along line 6-6 in FIG. 5. The solar simulator 10 may generally include an external frame 12 supporting a plurality of lamp mounts 14. These lamp mounts 14 each may support a lamp assembly 16 that directs a collimated beam of light 18 to a centrally-mounted multi-faceted mirror 20. The light beams 18 from the lamp assemblies 16 may be reflected by the mirror 20 and directed out of the external frame 12 through a main spectral filter 22 (if desired) and finally to a target plane 24. The combined light beams 18 may form a larger beam 19 that is formed from the various light beams and converges at the target plane 24. The mirror 20 may be shaped such that the beams of light 18 converge at the target plane 24 to form a location of intense light that effectively simulates solar light at up to 200 suns (where 1 sun is equivalent to the illuminance provided by the sun at earth, or approximately 100,000 lux).

Figure 7:
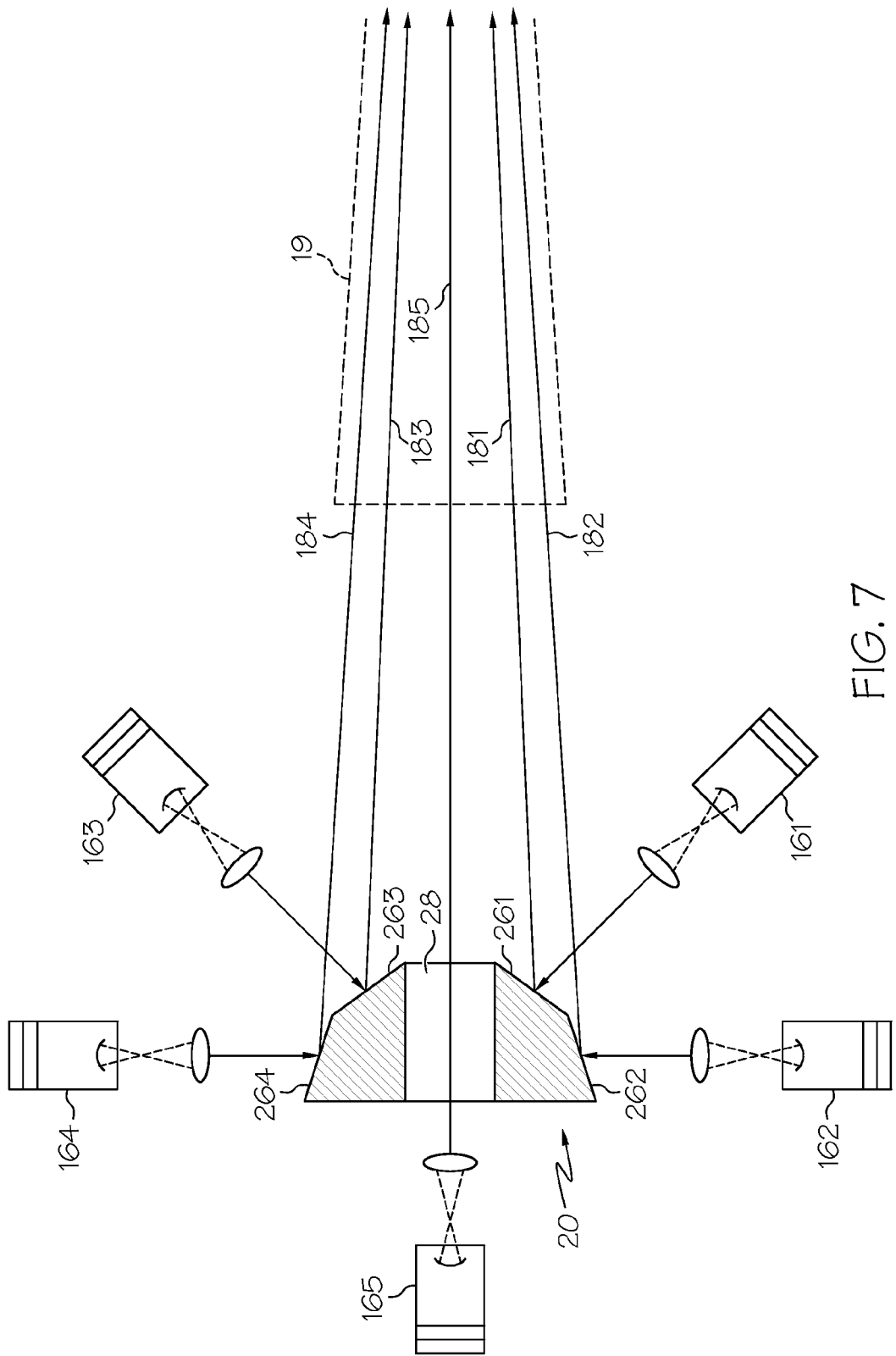
FIG. 7 is a schematic top plan view of the embodiment of FIG. 6 with the frame removed.

FIG. 7 illustrates the system configuration of the lamp assemblies 16 of the solar simulator 10 arranged in a plane as in FIG. 6. The arrangement of lamp assemblies 161-165 are shown for illustrative purposes, and may correspond generally to lamp assemblies 16E, P, B, H, and A, respectively (or any set of five lamps which may be coplanar with one another). This arrangement of lamp assemblies 16 is used to illustrate the relationship between the lamp assemblies 16 and the central mirror 20. Each of the lamp assemblies 161-165 may be oriented to direct a beam of light 181-185 onto the central faceted mirror 20. The central mirror 20 may include a plurality of facets (generally designated 26) including facets 261-264, wherein each may be angled to direct a beam of light from the lamp assembly 16 towards the target plane 24 (not shown). In addition to the five beams 181-185 illustrated, the remaining lamp assemblies 16 (not shown) each direct light to the central mirror 20 which reflects the beam of light towards the target plane 24 (not shown). The combined beams of light 18 from all of the lamp assemblies 16 are combined to form a main beam 19.

The central mirror 20 may include an opening 28 that allows a single beam of light 185 to pass through. This beam of light 185 may be directed downrange towards the target plane 24 and not reflected by the mirror 20.

According to further a further embodiment, the lamp assemblies 161-164 may be angled at specific orientations to the central lamp 165. For example, lamps 161 and 163 may be positioned at 45 degrees relative to the opening 28, while lamps 162 and 164 may be positioned at 90 degrees relative to the opening 28. The facets 26 of the mirror 20 preferably are positioned at approximately half of the angle of the lamp assemblies 16 in order to direct the various light beams 18 towards the target plane 24. In the embodiment illustrated in FIG. 7, the first facets 26A, C may be angled at approximately 22.5 degrees (π/8 radians) while the second facets 26 B, D may be angled at approximately 45 degrees (π/4 radians). According to this arrangement, the facets 26 may reflect the light beams 181-184 towards the target plane 24 where they may join the central beam 185 to form a main beam 19 that creates the effect of a solar light source at the target plane 24. While this figure illustrates five beams 18 converging to form a main beam 19, it is anticipated that the lamp assembly shown here may be rotated to include other lamp assemblies 16 which are not coplanar with the lamp assemblies 161-165 shown here (see, e.g., FIG. 1). According to one embodiment, lamp assemblies 161 and 163 may be two of six lamp assemblies 16 in a first group (16B-G in FIG. 2) and lamp assemblies 162 and 164 may be two of twelve lamp assemblies 16 in a second group (16H-V in FIG. 2). In such a described embodiment, the solar light simulator 10 may include nineteen lamp assemblies 16 (six in the first group plus twelve in the second group plus one indicated as 165 or 16A in FIG. 1), all of which generate a beam of light 18 which may be reflected from the central mirror 20 towards the target plane 24. These beams of light are combined to form the main beam 19 which may converge at the target plane 24.

Figure 8C:
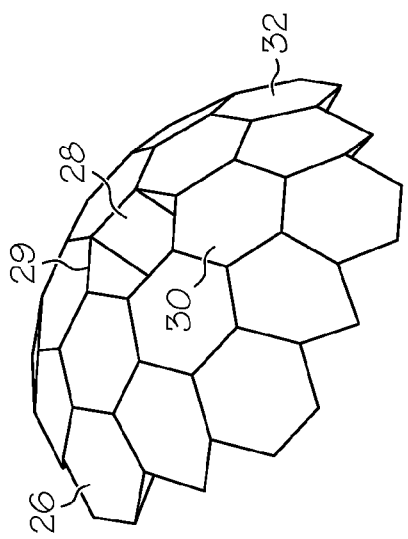
FIG. 8C is a perspective view of the multi-faceted mirror shown in FIGS. 8A-B.
Figure 8B:
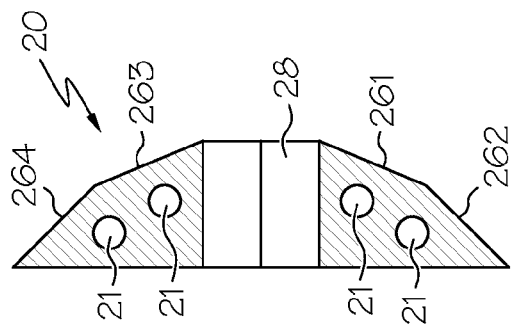
FIG. 8B is a side elevation in section along line 8B-8B of FIG. 8A.
Figure 8A:
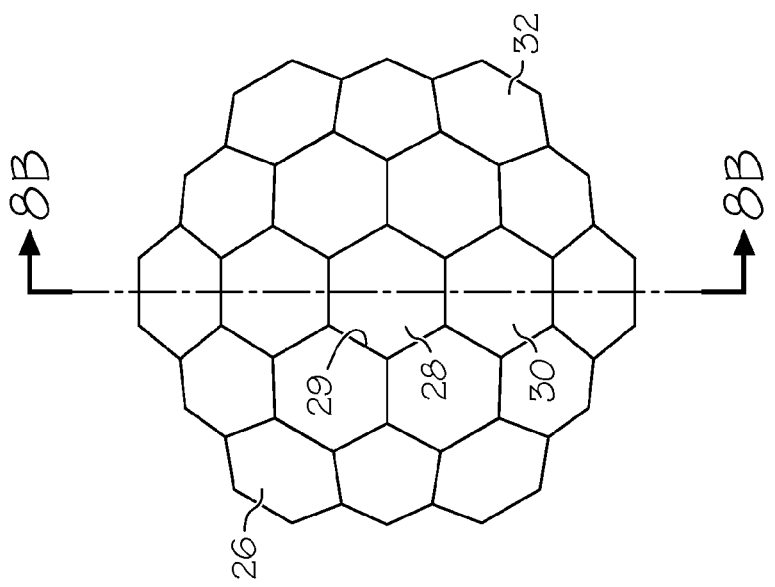
FIG. 8A is a front elevational view of the multi-faceted mirror of FIGS. 6 and 7.

As shown in FIGS. 8A-C, the mirror 20 may be dome shaped with the perimeter 29 of the central opening 28 being raised the most and the facets angled downwards away from the opening. As best shown in FIG. 8A, the combining mirror may have a central hexagonal opening 28, a first row 30 of hexagonal facets arranged about the perimeter 29 of the opening 28, and a second row 32 of hexagonal facets arranged about the first row. According to one embodiment, the mirror 20 may comprise a substrate with a plurality of integrally-formed reflective surfaces (for example, by diamond turning or polishing surfaces of the substrate). According to another embodiment, the mirror 20 may comprise a substrate with a plurality of mirrors mechanically and thermally bonded to the substrate. According to another embodiment, the mirror 20 may comprise a support structure for supporting a plurality of smaller mirrors, each individually positioned on the support structure.

The combining mirror 20 may include a cooling system 21, shown in FIG. 8B. Because of the high intensity of the lamps reflecting off of the mirror 20, the energy of the beams of light 18 may cause reflecting surfaces the mirror 20 to warp or crack (see FIG. 6). Therefore, it may be necessary to incorporate a water cooling system 21 (or other system to reduce heat build-up) that runs adjacent to the mirror 20 is attached and reduces heat build-up on the surfaces of the facets 261-264. The specific arrangement of the cooling system may vary according to the particular design of the reflecting mirror 20. For example, if the central mirror 20 consists of a number of individual facets 26 attached to a frame, the cooling system may comprise a web along the back of each facet 26. Alternatively, if the mirror 20 consists of a substrate with a highly reflective outer surface (or separate facets 26 thermally bonded to the substrate), it may only be necessary to cool the substrate, which in turn may draw heat from the facets 26. Cooling of the substrate may be accomplished through the use of cooling channels or lines (21, as shown in FIG. 8B) which may pass through the mass of the substrate. Coolant may then be pumped throughout the cooling channels 21, thereby drawing heat from the substrate through conduction. It may also be desired to cool the lamps 34 and lenses 38 (see FIG. 9) of the lamp assemblies 16. This may be accomplished through the use of forced air adjacent the lamps 34, whereby cooled air is directed across or adjacent to a lamp 34 or lens 38 so that the heat is dissipated from the structure by convection.

FIG. 8A shows a top view of the mirror 20 and illustrates the individual facets 26. According to the embodiment illustrated, the mirror may consist of a number of hexagonal facets 26 arranged around a hexagonal central opening 28. The number of facets 261-264 in each row 30, 32 may increase as the number of rows increases. For example, with a hexagonal central opening 28 and a first row 30 of six facets 26, a total of 7 beams of light 18 can be reflected by the mirror 20 towards the target plane 24 (see FIG. 6). According to the embodiment illustrated in FIGS. 1-5, the mirror 20 includes a central opening, a first row 30, and a second row 32. The second row 32 may consist of 12 hexagonal facets 26 for reflecting light towards a target plane 24 (not shown).

The combination of the various light beams 18 that may result in the main beam of light 19 (see FIG. 7) are each individually collimated by the optical system within each lamp assembly 16 (see FIG. 9). Accordingly, the individual rays of light in each beam 18 are approximately parallel, mirroring solar light. When the individual beams 18 are combined into a main beam 19, the rays of main beam 19 are no longer parallel, but converge gradually. In order to maintain an optimum level of collimation of the main beam 19, it is preferred that the length of main beam 19 be sufficiently long. By elongating the distance between the central mirror 20 and the target plane 24, the required angle between beams 18 may be reduced. The degree of collimation of main beam 19 may therefore be expressed as a ratio of the length from the central mirror 20 to the target plane 24 (not shown) to the size of the central mirror 20.

Were it desired to increase the number of lamp assemblies 16 contributing to the simulated solar light at the target plane 24 (not shown), additional rows 30, 32 of facets 26 could be added to the central mirror 20. This may require the central mirror 20 to be larger, which may require a greater distance between the central mirror 20 to the target plane 24 in order to maintain the degree of collimation of main beam 19. Alternatively, fewer lamps may be used, which may reduce the size of the central mirror 20 and may either increase collimation or allow a shorter distance between the central mirror 20 and target plane 24. It is understood that the intensity of light, collimation, and size of the apparatus may therefore be altered to reach an optimum level for the desired characteristics.

FIG. 8C illustrates the central mirror 20 in perspective view, illustrating the approximately hemispherical shape of the arranged facets 26 arranged in rows 30, 32 about the perimeter 29 of the central opening 28.

The facets of the combining mirror 20 have generally been assumed to be flat reflectors. Other variations on the shape of these facets is also anticipated. The facets may be curved or otherwise angled to deliver a beam according to the quality of the beam 18 as it is delivered from the lamp assembly 16.

The arrangement shown in FIGS. 8A-C is merely one of several which can be selected to obtain the desired results. The hexagonal arrangement of facets 26 is chosen due to the well-known close-packing nature of hexagonal lattices. Other polygons or packing arrangements may be selected, including but not limited to triangles, squares, pentagons, as well as combinations of various regular shapes, lattices of irregular shape, or combinations of regular and irregular shapes, without departing from the scope of the invention. However, as described above, other variations of facets may create a wider transmission beam which may be undesirable.

FIG. 9 illustrates an individual lamp assembly 16 of the type that is shown in FIGS. 6-8. This lamp assembly 16 may comprise a compact xenon lamp 34, an elliptical reflector 36, and a spherical lens 38. Light emitted from the xenon lamp 34 may be reflected by the elliptical reflector 36 to create a beam of light 18. At a short distance from the reflector 36, the beam 18 may have a focus diameter of approximately 5 mm. The beam 18 then may pass through the spherical lens 38 that reimages the light to a wider diameter. According to one embodiment, the reimaging lens 38 may increase the diameter of the light beam 18 by five times at 48", thereby creating a 100 mm diameter focus at a distance of 48 inches from the reimaging lens 38. This focal location may be identified as the target plane 24. According to this optical arrangement, the light photons of the individual beam 18 are substantially parallel and adequately mirror solar rays. The focal distance may be increased or shortened as required with appropriate modification of the light assemblies 16. Any appropriate light-emitting lamp may be substituted for the xenon lamp 34 without departing from the scope of the invention.

The above-described lamp assembly 16 may also include other optical components in order to further improve or modify the light quality. For example, a diffuser or other beam-shaping optics can be put in line with one or more of the individual lamp assemblies 16 to further shape or alter light control or to improve spatial uniformity. For example, it may be necessary to improve the conformity of the light across the illuminated area of the target plane 24. Accordingly, those skilled in the art will recognize that the shape and intensity of the illuminated area of the target plane 24 may be altered through use of various optics.

Additionally, the light from the xenon lamp 34 has been described as modified by an elliptical reflector 36 and a spherical focusing lens 38. It should be appreciated to those skilled in the art that variations of this optical system may be used to accomplish the objectives of the present invention. By way of example, a properly sized parabolic reflector may be used to provide the desired collimation and beam size at the target plane 24.

Under one alternative embodiment, each lamp assembly 16 may further comprise a spectral filter (not shown), similar to spectral filter 22 shown in FIG. 6 for the main beam 19. This variation may allow for the calibration of the light contribution from each lamp so that the total color saturation at the target plane 24 can be adjusted. By way of example, a filter may be used to remove some spectrum of light from one, some, or all of the beams 18. This would decrease the amount of that spectrum of light at the target plane 24, so that the color in the simulated solar light would be adjusted. Since the embodiment illustrated uses nineteen different lamps to achieve a full solar simulation, the color of the resultant light can be controlled accurately by selectively filtering one or more lamp assemblies 16. More lamp assemblies 16 and facets 26 may be added to increase the degree of control, subject to the issues discussed above regarding apparatus size and collimation, as well as other potential issues (e.g., heat).

According to a further improvement, the lamp assemblies 16 may include shading elements (not shown). By controlling the aperture of light for each lamp assembly 16, the size of the sun simulation can be altered, creating, for example, a strata of light intensities at the sun simulation location. By way of example, the center of the target area 24 may be at a maximum value of 100 suns, and individual lamps are controlled to gradually step down the intensity of the light as one moves radially away from the center of the test area 24. Such an arrangement would be useful in determining an optimum value for solar intensity, or for establishing baseline data, for example in paint wear testing (for example determining how much solar intensity per unit time is required to reduce paint beyond a required threshold due to fading). Alternatively, the shading elements may be used to further shape the light from each lamp assembly 16, thereby creating a shaped solar simulation.

According to a further embodiment, the power level of each or all of the xenon lamps 34 may be individually controlled. According to one embodiment, lamps 34 (FIG. 9) are each 3 kW lamps, each able to convert approximately 30% of their power consumption to light (producing approximately 1 kW of light energy per lamp 34), of which 50% can be usably extracted by solar collectors from the light as useable energy. By controlling the amount of energy used by each lamp 34, the intensity of that lamp's contribution to the solar simulation can be adjusted from full intensity to zero intensity. By way of example, if nineteen lamps 34 are in use and producing a total brightness equivalent to ninety-five suns (at five suns per lamp), then if the brightness is desired to be reduced to ninety suns, either one of the lamps could be reduced to zero intensity (switched off) or a number of the lamps could be adjusted to produce the requisite intensity. For example, if the color saturation of the solar simulation is being controlled by filters at one or more lamps 34, then it may be desirable to reduce the intensity of all of the lamps rather than reducing the intensity of one lamp, and thereby possibly affecting the desired color saturation and requiring readjustment.

According to a further embodiment, each of the lamp mounts 14 is adjustable, either directly or remotely. In order to calibrate the device properly, it may be necessary first to adjust the light assemblies 16 so that each beam 18 hits a designated facet 26 appropriately and is reflected to the center of target area 24. Because the focal length of the light beams 18 is relatively long, a small variation in the adjustment of the lamp 34 may result in one or more of the light beams 18 not contributing fully to the solar simulation at the target plane 24. Therefore, in order to calibrate the system properly, a target may be set up at the target plane 24 and each lamp mount 14 may be individually and separately adjusted while the remainder of the lamps are turned off. It also may be helpful to illuminate the central lamp (or another previously aligned lamp) while one of the lamps mounts 14 is being adjusted, to provide a reference point. If the apparatus is portable, it may be necessary to occasionally correct the mirrors to account for small disturbances. However, a fixed system may not require adjustment after an initial setup.

Figure 10A:
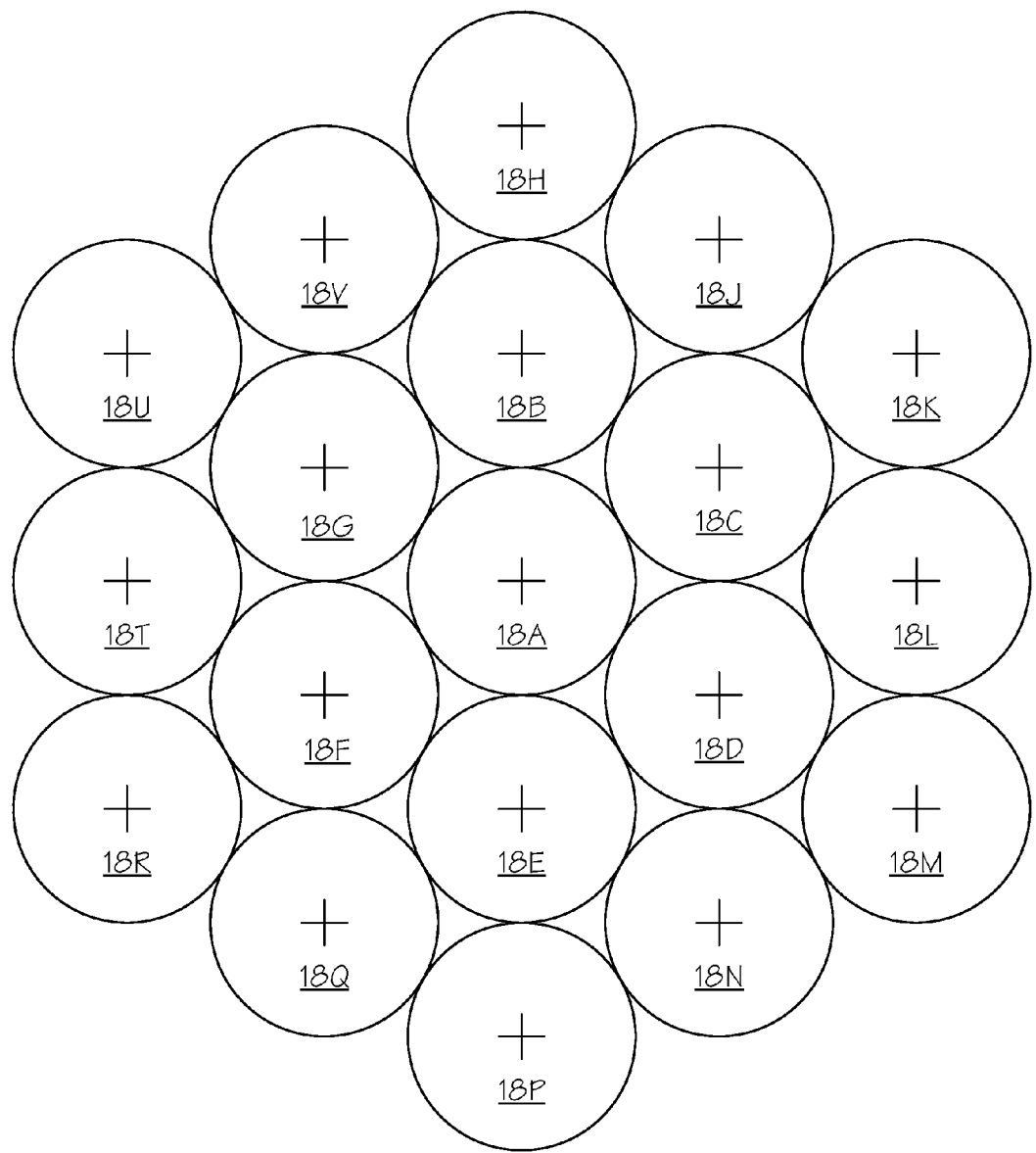
FIG. 10A illustrates schematically an individual beam arrangement at one point near the mirror of the embodiment of FIG. 6.
Figure 10B:
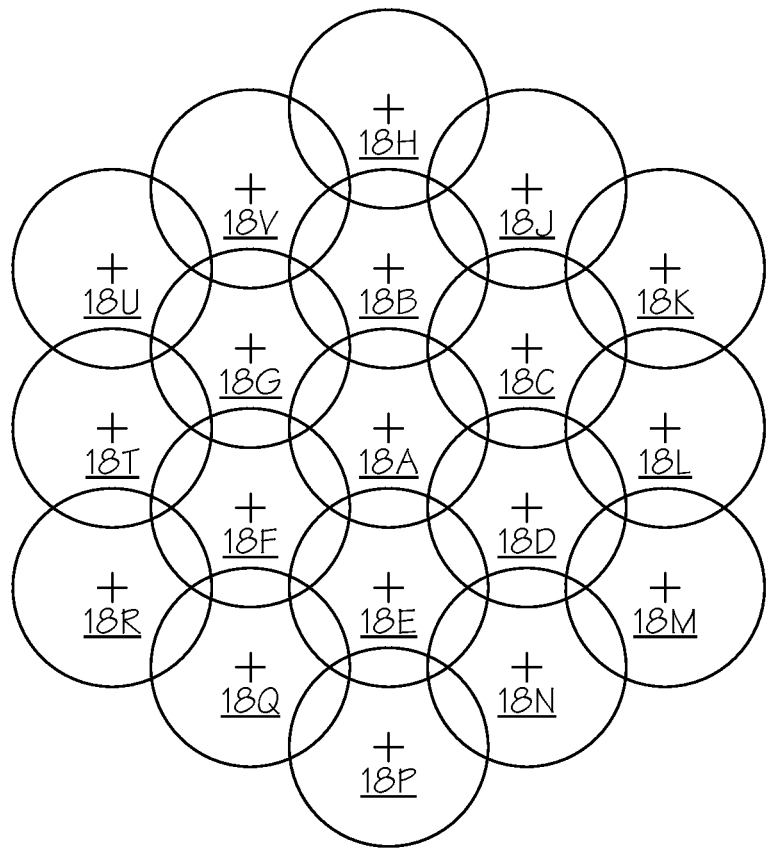
FIG. 10B illustrates schematically an individual beam arrangement at a point between the mirror and target plane of the embodiment of FIG. 6.
Figure 10C:
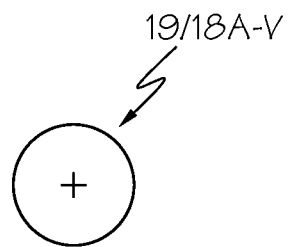
FIG. 10C illustrates schematically an individual beam arrangement at the target plane of the embodiment of FIG. 6

FIGS. 10A-C show the arrangement of the various beams 18A-V of light as they contribute to the main beam of light taken at a point near the central mirror 20 (FIG. 10A), at a distance between the mirror 20 and target plane 24 (FIG. 10B) and at the target plane (FIG. 10C) according to one illustration.

FIG. 10A shows the light beams at a distance near the mirror 20. At this point, the various light beams 18 may be substantially separate and form a wide main beam 19. Further, the individual diameters of the light beams are greater than the 100 mm focal diameter according to the embodiment described above.

FIG. 10B shows the light beams at a distance between the mirror 20 and target plane 24. Here the beams 18 have begun to overlap, creating sections of higher intensity light. The diameter of individual beams 18 has begun to reduce, and the total size of the main beam 19 is reduced as well.

FIG. 10C shows the view of the light beams at the target plane 24. All of the beams have overlapped, creating a compact substantially collimated beam with a high intensity, approximating 100-200 suns in intensity and effectively mimicking the characteristics of solar radiation.

The various embodiments described above are intended to be illustrative in nature and are not intended to limit the scope of the invention. Any limitations to the invention will appear in the claims as allowed.

What is claimed is:

1. A method for simulating solar light comprising:
   providing a convex reflective surface having a plurality of facets;
   providing a plurality of collimated light sources emitting a beam having a focal length;
   arranging the collimated light sources about the convex reflective surface so that each beam is directed to a facet and reflected to a target plane;
   further arranging the collimated light sources about the convex reflective surface so that the beams overlap at the target plane to thereby simulate solar light.

2. An apparatus for simulating solar light comprising:
   a plurality of light sources each comprising a lamp and optic components to produce a collimated beam;
   a convex mirror having a plurality of facets; and
   wherein the beams are projected onto the faceted mirror so that they converge at a target plane.

3. The apparatus of claim 2 wherein the facets comprise hexagonal planes.

4. The apparatus of claim 2 wherein the light sources are arranged in a non-planar manner.

5. The apparatus of claim 2 wherein the mirror includes a central opening.

6. The apparatus of claim 5 wherein a first light source projects through the central opening.

7. An apparatus for simulating solar light comprising:
   a faceted mirror having a substantially hemispherical convex outer surface, the faceted mirror having an opening, a plurality of first facets at a first angle to the opening and a plurality of second facets at a second angle;
   a first light source having a collimated beam, the first light source projected through the opening such that the beams pass substantially perpendicular to the plane of the opening;
   a second light source having a collimated beam, the second light source projected onto the first facets and having an incidence angle relative to the first light source of approximately twice the first angle;
   a third light source, the third light source projected onto the second facets and having an incidence angle relative to the first light source of approximately twice the second angle.

8. The apparatus of claim 7 further comprising a frame to which the faceted mirror and light sources are attached.

9. The apparatus of claim 8 further comprising mounting structure between the light source and the frame.

10. The apparatus of claim 9 wherein the mounting structure is adjustable.

11. The apparatus of claim 7 wherein the first facets are hexagonal.

12. The apparatus of claim 11 wherein the first angle is 22.5 degrees.

13. The apparatus of claim 7 wherein the second facets are hexagonal.

14. The apparatus of claim 13 wherein the second angle is 45 degrees.

15. The apparatus of claim 7 wherein the light sources have a common convergence point at a target plane.

16. The apparatus of claim 15 further comprising a spectral filter between the opening and the target plane.

17. An apparatus for simulating solar light comprising:
    a plurality of reflective surfaces arranged in a lattice;
    a plurality of lights directed at said reflective surfaces having a shared focal point; and
    a target plane at said focal point, said plurality of lights each focusing at the same location on said target plane so as to create a high intensity beam at said location.

18. The apparatus of claim 17 wherein the plurality of reflective surfaces comprises a faceted mirror.

19. The apparatus of claim 18 wherein the faceted mirror comprises a first row of facets at a first angle and a second row of facets at a second angle.

20. The apparatus of claim 19 wherein a first set of the plurality of lights are directed at said first row facets.

21. The apparatus of claim 20 wherein a second set of said plurality of lights are directed at said second row of facets.

22. The apparatus of claim 21 wherein the faceted mirror comprises a central opening.

23. The apparatus of claim 22 wherein one of said plurality of lights is directed through said central opening to impact said target plane.

24. A method for simulating solar light comprising:
    providing a convex mirror having a plurality of facets;
    generating a plurality of beams from a plurality of light sources; and
    directing each of said plurality of beams to a separate facet;
    reflecting said beams from said mirror to a target plane.

25. The method of claim 24 wherein said mirror comprises an opening through which a central beam from a central light source passes.

26. The method of claim 25 wherein said central beam comprises a focal length where a diameter of said central beam is at its narrowest.

27. The method of claim 26 wherein the target plane is positioned at the focal length of the central beam.

28. The method of claim 27 wherein said plurality of beams form a concentrated beam when reflected from said facets.

29. The method of claim 28 wherein said concentrated beam is collinear with said central beam.

30. The method of claim 29 wherein said concentrated beam has a focal length corresponding to said focal length of said central beam.

* * * * *